United States Patent
Snagg

(10) Patent No.: US 9,668,290 B1
(45) Date of Patent: May 30, 2017

(54) WIRELESS COMMUNICATION HEADSET SYSTEM

(71) Applicant: Ronald Snagg, Rosedale, NY (US)

(72) Inventor: Ronald Snagg, Rosedale, NY (US)

( * ) Notice: Subject to any disclaimer, the term of this patent is extended or adjusted under 35 U.S.C. 154(b) by 0 days.

(21) Appl. No.: 15/162,769

(22) Filed: May 24, 2016

(51) Int. Cl.
| | |
|---|---|
| *H04B 5/00* | (2006.01) |
| *H04W 76/02* | (2009.01) |
| *H04W 4/00* | (2009.01) |
| *H04W 12/04* | (2009.01) |
| *H04M 3/56* | (2006.01) |

(52) U.S. Cl.
CPC ........... *H04W 76/023* (2013.01); *H04M 3/56* (2013.01); *H04W 4/008* (2013.01); *H04W 12/04* (2013.01)

(58) Field of Classification Search
CPC .... H04W 4/008; H04W 84/18; H04M 1/6066
USPC .............. 455/41.1, 41.2, 550.1, 553.1, 556.1
See application file for complete search history.

(56) References Cited

U.S. PATENT DOCUMENTS

| | | | |
|---|---|---|---|
| 3,746,793 A * | 7/1973 | Sachs ................ | G06F 3/0489 345/168 |
| 3,939,418 A | 2/1976 | Morrison | |
| D318,053 S | 7/1991 | Ludeke | |
| 6,522,765 B1 | 2/2003 | Towle | |
| 7,110,800 B2 | 9/2006 | Nagayasu | |
| 7,844,220 B2 | 11/2010 | Wang | |
| 8,391,792 B2 * | 3/2013 | Glezerman ......... | H04M 1/6066 455/41.2 |
| 8,964,787 B2 * | 2/2015 | McMullin ............ | H04W 84/18 370/492 |
| 9,338,391 B1 * | 5/2016 | Greene ............. | H04N 21/4307 |
| 2008/0170740 A1 | 7/2008 | Gantz | |
| 2008/0233978 A1 * | 9/2008 | Batey ............... | H04M 1/05 455/41.2 |
| 2009/0068949 A1 * | 3/2009 | Lin .................. | H04M 1/05 455/41.3 |
| 2013/0322648 A1 * | 12/2013 | Chukka ............. | H04L 65/60 381/77 |
| 2015/0081067 A1 | 3/2015 | Yeh | |
| 2016/0039525 A1 * | 2/2016 | Pajic ................ | B64D 11/0638 108/44 |

FOREIGN PATENT DOCUMENTS

EP          1722540 A2     11/2006

* cited by examiner

*Primary Examiner* — Ayodeji Ayotunde
*Assistant Examiner* — Max Mathew
(74) *Attorney, Agent, or Firm* — Kyle A. Fletcher, Esq.

(57) ABSTRACT

The wireless communication headset system is a point to point communication system that is adapted for local area use between nearby users. The wireless communication headset system comprises a plurality of headsets. Each headset selected from the plurality of headsets further comprises a transceiver that is linked to the transceivers of each of the headsets remaining in the plurality of headsets thus allowing communication between each of the plurality of headsets. The wireless communication headset system allows for private communications between nearby users in noisy or crowded environments. The wireless communication headset system comprises the plurality of headsets.

11 Claims, 4 Drawing Sheets

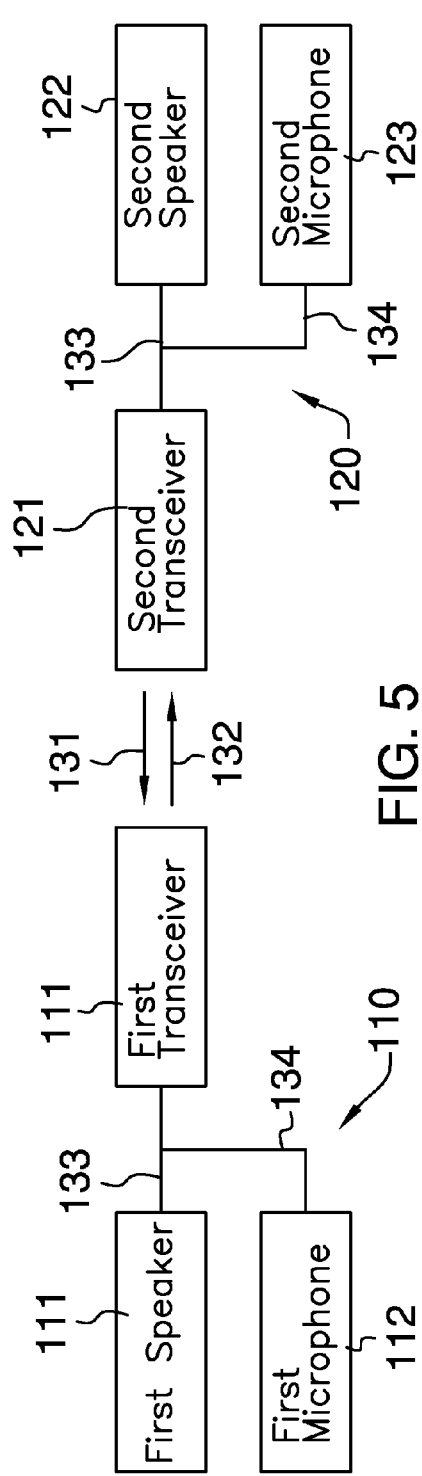
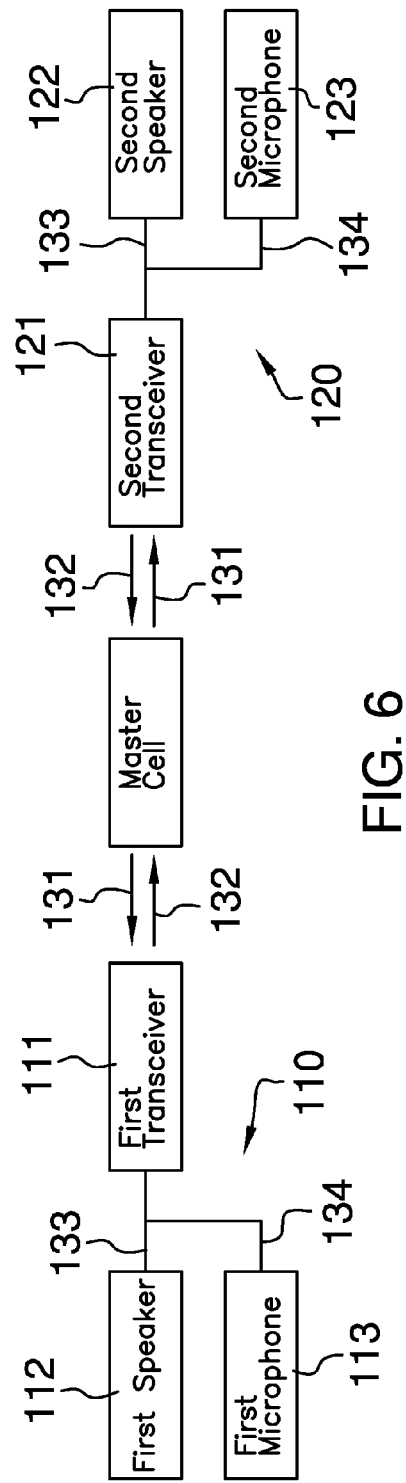
FIG. 5
FIG. 6

WIRELESS COMMUNICATION HEADSET SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of telephonic communications, more specifically, a point to point wireless communication system without network routing requirements.

SUMMARY OF INVENTION

The wireless communication headset system is a point to point communication system that is adapted for local area use between nearby users. Each headset selected from the plurality of headsets further comprises a transceiver that is linked to the transceivers of each of the headsets remaining in the plurality of headsets thus allowing communication between each of the plurality of headsets. The wireless communication headset system allows for private communications between nearby users in noisy or crowded environments.

These together with additional objects, features and advantages of the wireless communication headset system will be readily apparent to those of ordinary skill in the art upon reading the following detailed description of the presently preferred, but nonetheless illustrative, embodiments when taken in conjunction with the accompanying drawings.

In this respect, before explaining the current embodiments of the wireless communication headset system in detail, it is to be understood that the wireless communication headset system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the wireless communication headset system.

It is therefore important that the claims be regarded as including such equivalent construction insofar as they do not depart from the spirit and scope of the wireless communication headset system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 5 is a block diagram of an embodiment of the disclosure.

FIG. 6 is a block diagram of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
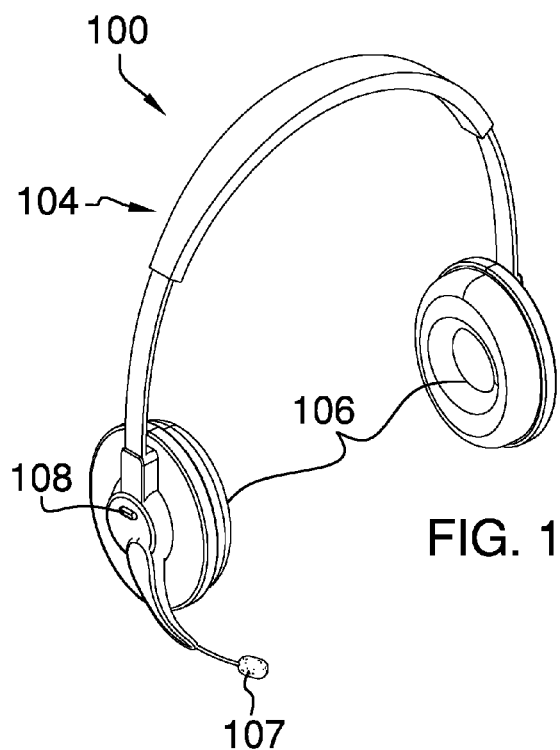
FIG. 1 is a perspective view of an embodiment of the disclosure.
Figure 2:
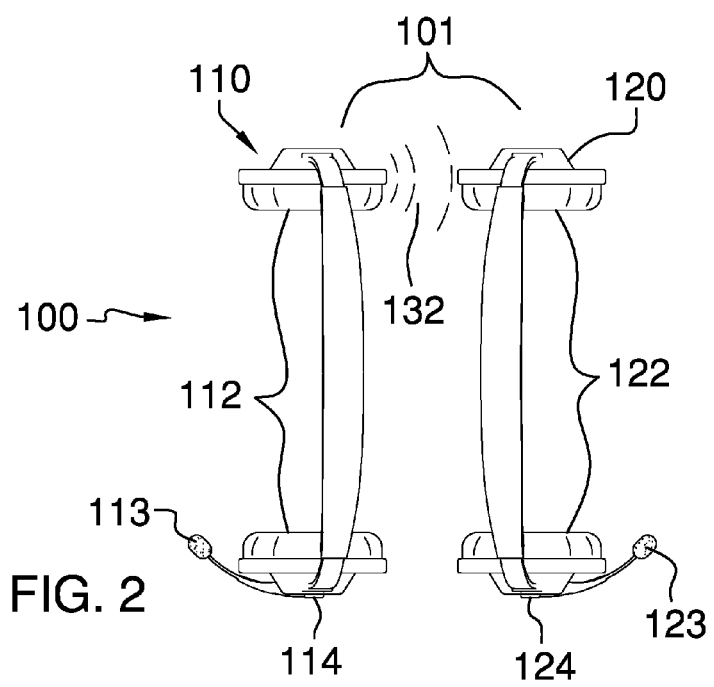
FIG. 2 is a top view of an embodiment of the disclosure.
Figure 3:
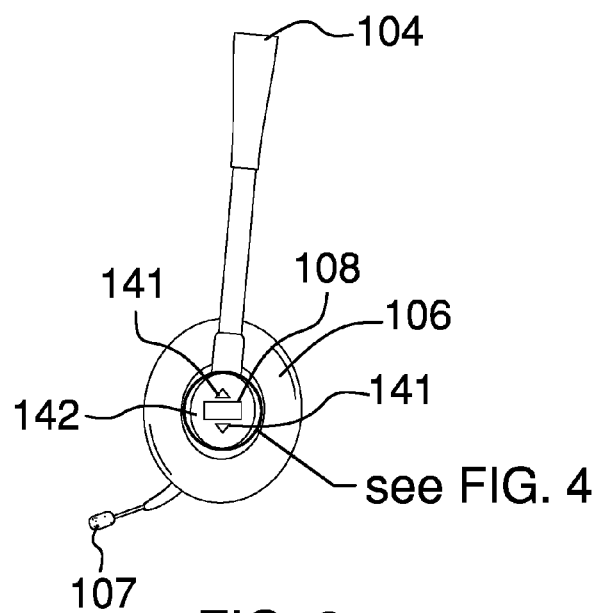
FIG. 3 is a side view of an embodiment of the disclosure.
Figure 4:
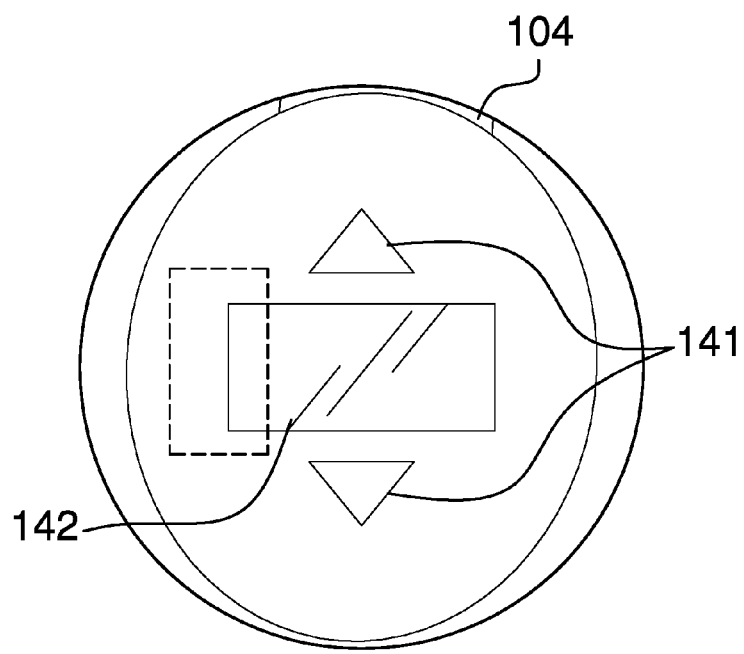
FIG. 4 is a detail view of an embodiment of the disclosure.
Figure 7:
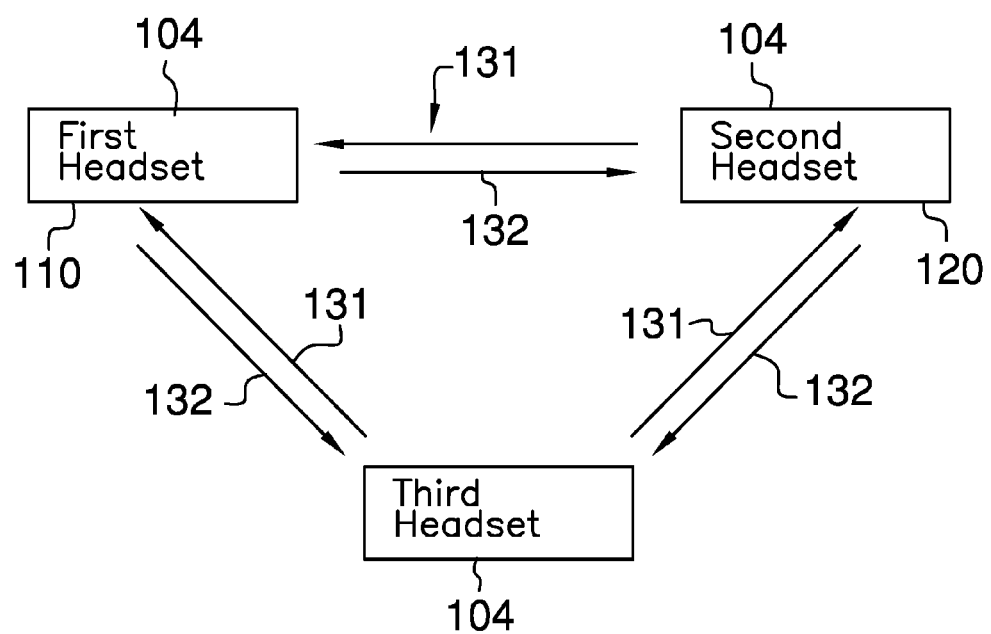
FIG. 7 is a block diagram of an embodiment of the disclosure.

Detailed reference will now be made to one or more potential embodiments of the disclosure, which are illustrated in FIGS. 1 through 7.

The wireless communication headset system 100 (hereinafter invention) comprises a plurality of headsets 101. The invention 100 is a point to point communication system that is adapted for local area use between nearby users. The invention 100 is adapted to operate independently from a commercially available communication network. Each headset selected from the plurality of headsets 101 further comprises a transceiver 105 that is linked to the transceivers 105 of each of the headsets remaining in the plurality of headsets 101 thus allowing communication between each of the plurality of headsets 101. The invention 100 allows for private communications between nearby users in noisy or crowded environments.

Each individual first headset 110 selected from the plurality of headsets 101 is an acoustic device that takes the form of a headset, an earphone, or an earbud. The function of the each individual first headset 110 is to receive a first electrically coded representation 131 of a signal through the transceiver 105 associated with the individual first headset 110. The transceiver decodes the first electrically coded representation 131 of the signal into a first electrical signal 133 that is converted into an audible sound by a speaker 106. Each individual first headset 110 also performs the reverse function by converting an audible sound into a second electrical signal 134 using a microphone 107. This second electrical signal 134 is converted by the transceiver 105 into a second electrically coded representation 132 of the second electrical signal 134. The transceiver 105 then transmits as a radio signal this second electrically coded representation 132 of the second electrical signal 134 to an individual second headset 120 selected from the plurality of headsets 101. The individual second headset 120 receives this second electrically coded representation 132 and treats the second electrically coded representation 132 as if it was a first electrically coded representation 131 of a signal as described in this paragraph.

Each individual headset 104 selected from the plurality of headsets 101 comprises a transceiver 105, a speaker 106, a microphone 107, and a control set 108. The transceiver 105 is a commercially available electrical device that: 1) receives the second electrical signal 134 from the microphone 107; 2) converts the second electrical signal 134 into a second electrically coded representation 132 of the second electrical signal 134, 3) transmits the second electrically coded representation 132 of the second electrical signal 134 to a different individual headset 104 selected from the plurality of headsets 101; 4) receives a first electrically coded representation 131 of a signal; 5) decodes the first electrically coded representation 131 of a signal into a first electrical signal 133; and, 6) passes the first electrical signal 133 to the speaker 106. The speaker 106 is a collection of one or more commercially available speakers that are placed in or near the ear or ears of a user. Each speaker 106 is a transducer that receives the first electrical signal 133 and uses the first electrical signal 133 to generate an audible sound. The microphone 107 is a commercially available transducer that receives audible signals from the environment and converts the audible signals into the second electrical signal 134. The control set 108 is used to control the volume of the audible sound generated through the speakers 106. The control set 108 is further used to control which of the headsets remaining in the plurality of headsets 101 an individual headset 104 is communicating with when the plurality of headsets 101 comprises more than two individual headsets 104. The control set 109 comprises a plurality of buttons 141 and an optional display 142. When used, the optional display 142 displays the identification of the headset remaining in the plurality of headsets 101 that an individual headset 104 is communicating with.

In a first potential embodiment of the disclosure, as shown most clearly in FIG. 5, the plurality of headsets 101 comprises first headset 110 and a second headset 120. The first headset 110 comprises a first transceiver 111, a first speaker 112, a first microphone 113, and a first control set 114. The second headset 120 comprises a second transceiver 121, a second speaker 122, a second microphone 123, and a second control set 124. The first transceiver 111 is a commercially available Bluetooth transceiver. The second transceiver 121 is a commercially available Bluetooth transceiver. The first headset 110 and the second headset 120 are linked together using an encrypted Bluetooth protocol and are then used as a normal Bluetooth headset.

A second potential embodiment of the disclosure is an extension of the first potential embodiment of the disclosure that further comprises a master personal data device 102. In this scenario, the first transceiver 111 and the second transceiver 121 are independently linked to the master personal data device 102 and the master personal data device 102 acts as a repeater that passes messages between the first headset 110 and the second headset 120.

A third potential embodiment of the disclosure is an extension of the first potential embodiment of the disclosure that further comprises more than two headsets in the plurality of headsets 101. In this scenario, communication between the headsets contained within the plurality of headsets 101 is segregated through manipulation of shared key authentication codes associated with the Bluetooth transceivers 105.

A fourth potential embodiment of the disclosure is an extension of the third potential embodiment of the disclosure through the use of the master personal data device 102 in a manner analogous to its use in the second potential embodiment of the disclosure.

The individual headsets 104 are used as a normal Bluetooth headset would be used.

In the first potential embodiment of the disclosure, commercially available Bluetooth headsets are modified such that they could be linked together using standard Bluetooth encryption codes.

In the second potential embodiment of the disclosure, commercially available and unmodified Bluetooth headsets are connected to the master personal data device 102 using standard Bluetooth protocols. The master personal data device 102 is a commercially available personal data device. The master personal data device 102 runs an application that transfers communications between each of the plurality of headsets 101. The second potential embodiment of the disclosure is readily extended beyond a first headset 110 and a second headset 120. Methods to design, code and implement an application to perform the functions described in this disclosure are well known and documented in the electrical and software arts.

In the third potential embodiment of the disclosure, is an extension of the first potential embodiment of the disclosure in that the first potential embodiment of the disclosure further comprises more than two individual headsets 104 each of which are modified in a manner similar to the first potential embodiment of the disclosure. Communication between each of the headsets contained within the plurality of headsets 101 is segregated by varying the shared key authentication codes used to share communication between the Bluetooth transceivers of each of the headsets. The Bluetooth headsets are further modified by modifying the button input sequences such that a user can choose between the headsets contained within the plurality of headsets 101.

The following definitions were used in this disclosure:

Audio Source: As used in this disclosure, an audio source is a device that generates electrical signals that can be converted into audible sounds by a speaker.

Bluetooth: As used in this disclosure, Bluetooth is a standardized communication protocol that is used to wirelessly interconnect electronic devices.

Earbud: As used in this disclosure, an earbud refers to a miniature headphone that is worn inside the ear.

Earphone: As used in this disclosure, an earphone refers to a device that converts electrical signals into audible sounds that are worn or listened to in contact with the ear.

Headphone: As used in this disclosure, a headphone is a device that comprises one or two earphones that are held to the ear, typically through the use of a band placed on top of the head. Headset is a synonym for headphone.

Personal Data Device: As used in this disclosure, a personal data device is a handheld device that is used for managing personal information and communication. Examples of personal data device include, but are not limited to, cellular phones, tablets and smart phones.

Transceiver: As used in this disclosure, a transceiver is a device that is used to transmit and receive radio signals.

Transducer: As used in this disclosure, a transducer is a device that converts a physical quantity, such as pressure or brightness into an electrical signal or a device that converts an electrical signal into a physical quantity.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A communication device comprising:
   a plurality of headsets;
   wherein the communication device provides for point to point communication between the headsets;
   wherein the communication device is adapted to facilitate communication between a plurality of users;
   wherein the communication device is adapted to operate independently from a commercially available communication networks;
   wherein each first user selected from the plurality of users uses a first headset selected from the plurality of headsets to communicate with a second user selected from the remaining plurality of users through a second headset selected from the remaining plurality of headsets;
   wherein each individual headset selected from the plurality of headsets is an acoustic device;
   wherein each individual headset is selected from the group consisting of a headset, an earphone, or an earbud;
   wherein each headset selected from the plurality of headsets comprises a transceiver, a speaker, and a microphone;
   wherein the first headset receives a first electrically coded representation of a signal;
   wherein the first headset decodes the first electrically coded representation of the signal into a first electrical signal that is converted into an audible sound by a first speaker associated with the first headset;
   wherein the first headset converts an audible sound into a second electrical signal using a first microphone associated with the first headset;
   wherein the first headset converts the second electrical signal into a second electrically coded representation of the second electrical signal;
   wherein the first headset transmits as a radio signal the second electrically coded representation to the second headset;
   wherein the transceiver is an electrical device;
   wherein the transceiver receives the second electrical signal from the microphone;
   wherein the transceiver converts the second electrical signal into a second electrically coded representation of the second electrical signal;
   wherein the transceiver transmits as a radio signal the second electrically coded representation of the second electrical signal;
   wherein the transceiver receives a first electrically coded representation of a signal.

2. The communication device according to claim 1 wherein the transceiver decodes the first electrically coded representation of a signal into a first electrical signal.

3. The communication device according to claim 2 wherein the transceiver passes the first electrical signal to the speaker.

4. The communication device according to claim 3
   wherein the speaker is a collection of one or more transducers that are placed in or near the ear or ears of a user selected from the plurality of users;
   wherein the speaker uses the first electrical signal to generate an audible sound.

5. The communication device according to claim 4 wherein the microphone is a transducer that receives audible signals from the environment and converts the audible signals into the second electrical signal.

6. The communication device according to claim 5
   wherein each individual headset selected from the plurality of headsets further comprises a control set;
   wherein the control set comprises a plurality of buttons;
   wherein the plurality of buttons are attached to the individual headset;
   wherein the plurality of buttons controls the volume of the speakers.

7. The communication device according to claim 6
   wherein the control set further comprises a display;
   wherein the display is attached to the individual headset.

8. The communication device according to claim 7
   wherein the plurality of headsets comprises the first headset and the second headset;
   wherein the first headset comprises a first transceiver, a first speaker, a first microphone, and a first control set;
   wherein the first transceiver is the transceiver of the first headset;
   wherein the first speaker is the speaker of the first headset;
   wherein the first microphone is the microphone of the first headset;
   wherein the first control set is the control set of the first headset;
   wherein the second headset comprises a second transceiver, a second speaker, a second microphone, and a second control set;
   wherein the second transceiver is the transceiver of the second headset;
   wherein the second speaker is the speaker of the second headset;
   wherein the second microphone is the microphone of the second headset;
   wherein the second control set is the control set of the second headset;
   wherein the first transceiver is a Bluetooth transceiver;
   wherein the second transceiver is a Bluetooth transceiver.

9. The communication device according to claim 8
   wherein the communication device further comprises a personal data device;
   wherein the first transceiver is linked to the personal data device;
   wherein the second transceiver is linked to the personal data device;
   wherein the personal data device passes messages between the first transceiver and the second transceiver.

10. The communication device according to claim 8
    wherein the plurality of headsets comprises more than two headsets;
    wherein the transceiver of each of the plurality of headsets is a Bluetooth transceiver;

wherein the communication between any third headset selected from the plurality of headsets and any headset, other than the third headset, remaining in the plurality of headsets communication between each of the plurality of headsets is managed through the through the manipulation of the shared key authentication codes the third headset selected from the plurality of headsets and each headset, other than the third headset, remaining in the plurality of headsets.

11. The communication device according to claim 10 wherein the communication device further comprises a personal data device;

wherein the transceiver of each headset selected from the plurality of headsets is linked to the personal data device;

wherein the personal data device passes messages between the transceivers associated with any two headsets selected from the plurality of headsets.

\* \* \* \* \*